Dec. 23, 1952     O. E. ZUIDERHOEK     2,622,371

MACHINE FOR GENERATING AIRFOIL PROFILES

Filed Oct. 25, 1950     2 SHEETS—SHEET 1

FIG.1

INVENTOR
OTUS E. ZUIDERHOEK

BY *Russell M. Lopes, Jr.*
AGENT

Dec. 23, 1952  O. E. ZUIDERHOEK  2,622,371
MACHINE FOR GENERATING AIRFOIL PROFILES
Filed Oct. 25, 1950  2 SHEETS—SHEET 2
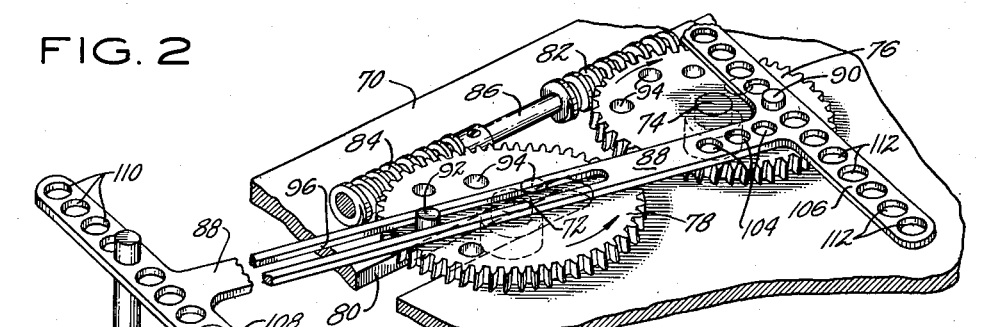
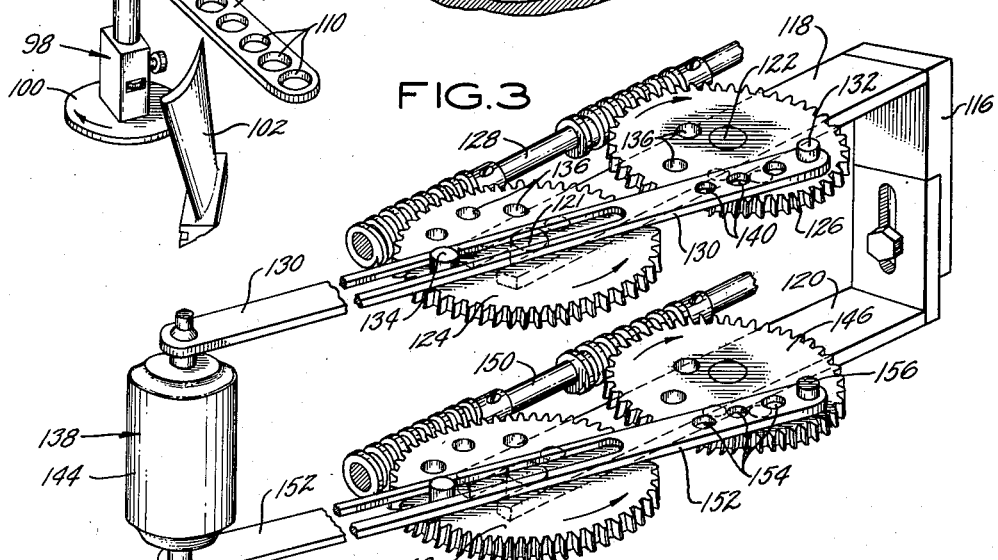
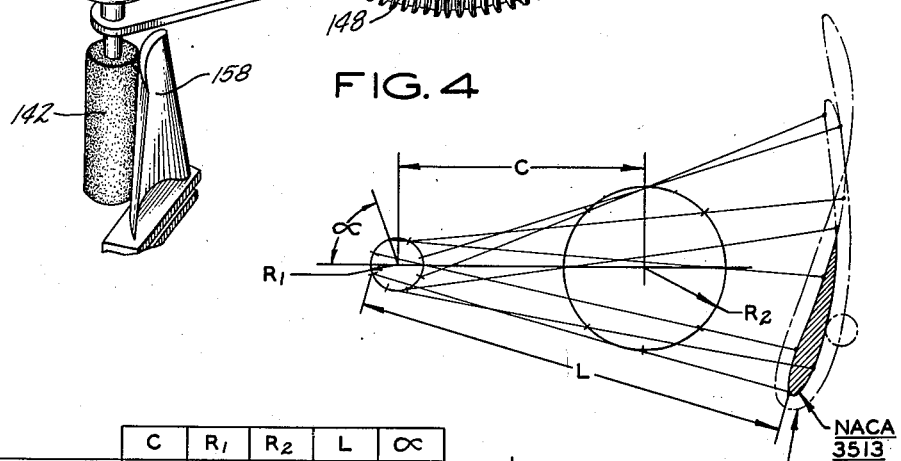
|  | C | $R_1$ | $R_2$ | L | $\alpha$ |
|---|---|---|---|---|---|
| NACA 3513 | 1.48 | .17 | .49 | 2.62 | 73° |
| ₵ TOOL | 1.48 | .31 | .49 | 3.77 | 45° |
INVENTOR
OTUS E. ZUIDERHOEK
BY Russell M. Lipes, Jr.
AGENT Patented Dec. 23, 1952

2,622,371

UNITED STATES PATENT OFFICE 2,622,371

MACHINE FOR GENERATING AIRFOIL PROFILES

Otus E. Zuiderhoek, Glastonbury, Conn., assignor to United Aircraft Corporation, East Hartford, Conn., a corporation of Delaware Application October 25, 1950, Serial No. 192,051

11 Claims. (Cl. 51—32)

1

This invention relates to apparatus for generating irregular shaped sections, more particularly airfoil profiles.

A feature of this invention is an improved and simplified machine for mechanically describing airfoil profiles. Another feature of this invention is a machine which accurately and yet speedily produces any desired airfoil profile.

The manufacture of blades and vanes having essentially a cross-section of airfoil shape is very difficult, being unduly laborious and involving a great expenditure of time. The task of laying out a single airfoil profile requires a multitude of calculations and many hours of labor, and even then a certain amount of guesswork is involved in hand fairing the stations which define the outline of the calculated profile. Thus, the same airfoil profile, laid out at different times or by different individuals, will vary somewhat due to the human element involved. Profiles calculated and developed by draftsman and designers are used for inspecting the airfoil portions of finished blades and vanes or for making master cams from which the airfoil portions of blades and vanes are manufactured. Here, the human error involved in the inspection process or in the manufacturing of the cam master is reflected in the finished article.

This invention is a machine which will accurately generate airfoil profiles with such a consistency that variations between subsequently made profiles virtually are eliminated, and which minimizes any error in the inspection and manufacturing of blades and vanes. With this invention, once the necessary parameters of a particular airfoil are known, it is a simple matter to adjust the machine to accurately generate the desired airfoil profile. By plotting the adjustment parameters, one graph will suffice for a family of airfoils of similar profile but of different camber, the size of the profile being a scale factor.

Also, by using two generators mounted in substantially parallel relationship, one of the generators being adjusted to describe the tip section and the other being adjusted to describe a base section, the airfoil portion of a blade or vane can be formed or finished.

For a better and more complete understanding of the invention reference should now be had to the following specification and to the accompanying drawings.

In the drawings:

Fig. 1 is a perspective of a drafting machine constructed in accordance with this invention for drawing airfoil profiles.

2

Fig. 2 is a schematic arrangement for inspecting the airfoil portion of blade or vane.

Fig. 3 is a schematic arrangement for manufacturing the airfoil portion of a blade or vane.

Fig. 4 is a diagrammatic of the typical adjustment parameters for describing a particular airfoil profile.

Referring now to Fig. 1. table 10 has mounted at opposite sides vertical posts 12 and 14. Extending between these posts is a guide bar 16 having brackets 18 and 20 slidable thereon. Each bracket has an adjustment of the screw-clamp type, not shown, by which the brackets can be locked at desired locations along the guide bar. The brackets support bevel gears 22 and 24, the shaft of each gear extending through its respective bracket and being connected to an arm which, when the machine is in operation, rotates in a plane parallel to that of table 10. Arm 26 is connected to the shaft of gear 24 and arm 28 is connected to the shaft of gear 22.

Gears 22 and 24 are in mesh with and are driven in opposite directions by bevel gears 30 and 32 on shaft 34. These latter gears are slideable on this shaft, but are locked against rotation as by a key and keyway, not shown. The shaft is parallel to guide bar 16, being supported within bearings 36 and 28 attached to brackets 18 and 20, respectively, and is powered by any suitable means; in this case a small electric motor within housing 40 on top of post 12; the motor having an electrical lead 42.

A channel-shaped link 44 is pivotally attached to the flange on each of the rotating arms. Each attachment comprises two clamping members, 46 and 48, which are pivotally attached together; members 46 being mounted on the rotating arms and members 48 being mounted on the common link 44. Each member is provided with suitable means so that it can be locked to its associated element, as for example by the clamping bar 50 and hold-down screws 52 shown in member 46 on arm 28. In other words, each member 46 can be clamped to its respective rotating arm and members 48 can be clamped to link 44 so that relative movement between the elements is prevented. Members 46 always are locked at a predetermined location on each rotating arm while only one of the two members 48 is locked to the link 44, the link being permitted to slide within the other clamping member as the machine functions. If both members are secured to link 44, all of the elements of the machine would be locked together and operation would not be possible.

A carriage 54 is mounted on link 44 and supports scriber 56 which describes the particular airfoil profile as the machine operates. A scale 58 is provided along one edge of link 44 so that the relative position of the scriber can be established. A similar scale is provided along the edge of guide bar 16, shown at 60, by which the positions of brackets 18 and 20 can be established. Likewise, scales are provided along one of the flanges of each of the rotating arms 26 and 28, as can be seen at 62 on arm 28, so that the position of the clamping members 46 can be established in relation to the axis of rotation of each of the rotating arms.

The angular relationship, or phase angle, between rotating arms 26 and 28 may be adjusted by loosening bolt 64 on arm 26, to free the arm, and then turning the arm to its new position where it is locked by tightening the bolt. Scale 66, calibrated in degrees, is provided to indicate the angular relationship between the two rotating arms.

In Fig. 2, a machine is shown which embodies the principles of this invention for inspecting the airfoil portion of a blade or vane. Platform 70 has mounted thereon two stub shafts 72 and 74 which act as bearings for gears 76 and 78. Shaft 72 is slideable within slot 80 so that the center distance between the gears can be varied. These gears are driven in opposite directions by worm gears 82 and 84 on shaft 86 which is powered by a source not shown. The shaft is parallel to slot 80 and at least one of the gears 76 and 78 is removable from its stub shaft so that the gear can be rotated with respect to its worm gear and the phase angle between gears 76 and 78 changed. A link 88 is affixed to the two gears, being pivotally secured to gear 76 at pin 90 and slideably attached to gear 78 at pin 92. A series of holes 94 to receive the pivot pins 90 and 92 are provided in the gears so that the distance of each pivot pin from the rotational axis of its respective gear can be varied as required. Link 88 has an axially extending slot 96 in which pin 92 slides when the generator is in operation. Means for securing link 88 on pivot pins 90 and 92 has not been shown to relieve the drawing of details which would only tend to confuse the basic principles illustrated. It is obvious that the link should be secured in some fashion.

Mounted on the end of link 88 is an inspection tool 98 having a follower 100 for determining the quality of blade 102, secured in a fixed relation to platform 70. The opposite end of the link is provided with holes 104 so that the distance of the tool from the fixed pin 90 can be varied. The extremities of link 88 have extensions 106 and 108 in which are holes 110 and 112. The holes in extension 108 provide an additional range of adjustment for inspection tool 98 and the holes in extension 106 provide an additional range of adjustment for pivot pin 90.

In Fig. 3, a combination of profile generators similar to that illustrated in Fig. 2 is shown in an arrangement for manufacturing the airfoil portion of a blade or vane. Extending from a common base 116 are two extensions 118 and 120 each supporting a generator constructed according to the principles of this invention. It is to be understood that the distance between machines may be varied. Mounted on bearings 121 and 122 on the upper extension 118 are two gears 124 and 126. These gears are driven in opposite directions by worm gear shaft 128 and are capable of having the distance between their rotational axes, as well as their phase angles, varied as described above in connection with Fig. 2. A link 130 is pivotally attached to gear 126 at 132 and slideably attached to gear 124 at 134. Holes 136 are provided in gears 124 and 126 so that the distance of pivots 132 and 134 from the axis of rotation of their respective gears may be varied. The outer end of link 130 forms a support for the upper end of manufacturing tool 138, a series of holes 140 being provided on the opposite end of the link for varying the distance of the manufacturing tool from pivot 132. The manufacturing tool may be, for example, a grinding wheel 142 on the shaft of a motor 144.

Similarly, a profile generator comprising gears 146 and 148, drive shaft 150, and link 152 is mounted on the lower extension 120. The outer end of link 152 is attached to the manufacturing tool 138 at a point axially spaced from the connection with link 130, holes 154 being provided on the opposite end of the link for varying the distance of the manufacturing tool from pivot 156 on gear 146. A blade 158 to be manufactured is mounted in fixed relation to the machine and is in contact with grinding wheel 142.

It is to be noted that the extensions 118 and 120, while usually parallel in a horizontal plane, are not necessarily parallel in a vertical plane, the relationship being determined by the characteristics of the blade being manufactured. Refinements in the blade, however, can be introduced by varying the horizontal relationship.

As is apparent from the preceding description, there are five variables in connection with this generator which are adjusted to determine the particular airfoil profile to be produced. These variables are: (1) the distance between the axes of the rotating members; (2) the radius of rotation of the fixed pivot on its rotating member; (3) the radius of rotation of the sliding pivot on its rotating member; (4) the distance of the scriber, inspection tool, or manufacturing tool from the fixed pivot; and (5) the phase angle between the two rotating members. Three of these variables, i. e., the distance between the axes of the rotating members, the radius of rotation of the fixed pivot, and the distance of the tool from the fixed pivot, control the chord length and thickness distribution of the particular airfoil and a machine incorporating these variables will reproduce uniform airfoil profiles. By regulating the radius of rotation of the sliding pivot as well as the phase angle, camber is worked into the airfoil profile. Other variables, such as the holes 110 and 112 in extensions 108 and 106 in Fig. 2, introduce a refinement into the five basic variables. These two additional variables, while not changing the basic concept, increase the range of the generator. Substantially the same result can be obtained by altering the position of slot 96 in link 88 so that the slot is not parallel with the axis of this link. The use of these refinements is dictated by the nature of the airfoil profile being generated.

In connection with the inspection machine illustrated in Fig. 2, and the manufacturing machine illustrated in Fig. 3, it should be noted that the settings of the machine are not necessarily the settings of the particular airfoil profile being inspected or manufactured. Since a follower is used with the inspection tool, and a grinding wheel or cutter used with the manufacturing tool, the diameter of these rotating elements must be taken into consideration. Actually, the setting which is made on these machines is for the path of the center-line of the tool, this path being called the envelope.

Fig. 4 shows the envelope of the center-line of an inspection or manufacturing tool, as well as the profile of the desired airfoil, in this case an NACA 3513 airfoil. The chart accompanying this figure shows the settings, in percent of chord of the desired profile, of the five parameters: (1) for describing an NACA 3513 airfoil section, and (2) for inspecting or manufacturing the NACA 3513 airfoil section. In this chart, C indicates the distance between the axes of the rotating members, $R_1$ the radius of rotation of the fixed pivot, $R_2$ the radius of rotation of the sliding pivot, $l$ the distance of the scriber or tool from the fixed pivot, and $\alpha$ the phase angle. It is to be noted that for these particular settings the path of the scriber or tool is roughly a figure 8. This is particularly advantageous in manufacturing a blade or vane as this added loop provides an opportunity for making adjustments or dressing the manufacturing tool.

Before operating the machine shown in Fig. 3, the parameters of the envelope which will produce an airfoil profile corresponding to the base section of the blade being manufactured are set on the upper generator, and the parameters of the envelope producing the required tip profile of the blade are set on the lower generator. The machine then is caused to operate and as it completes a cycle of operation, the manufacturing tool will generate the desired airfoil portion of a blade or vane.

To describe a particular airfoil profile, a familiarity with the operation of the machine by the operator is assumed. In view of this familiarity, the operator when given a particular airfoil profile to generate can make an approximation of the correct settings on the machine and then compare the generated profile with that of a known master profile. The differences will be obvious upon comparison and the operator then will be able to make the necessary adjustments to reproduce the master profile with unlimited accuracy. Once the proper setting of each of the parameters for a selected airfoil profile has been determined, these settings are recorded and the record serves as a basis for the rapid reproduction of the particular airfoil profile when required at a future time.

It is to be understood that the invention is not limited to the specific devices herein illustrated and described, but may be used in other ways without departure from their spirit as defined by the following claims.

I claim:

1. A generator of the class described including a support, spaced rotatable shafts carried by said support, the distance between said shafts being adjustable, a link having an eccentric connection with one of said shafts, an eccentric sliding connection between the other shaft and the link, means for synchronously rotating said shafts in opposite directions, and a tool carried by said link and movable in a predetermined path as the shafts rotate.

2. A generator of the class described including a support, spaced rotatable shafts carried by said support, the distance between said shafts being adjustable, a link having an eccentric connection with one of said shafts, an eccentric sliding connection between the other shaft and the link, one of said eccentric connections being radially adjustable with respect to its rotatable shaft, means for synchronously rotating said shafts in opposite directions, and a tool carried by said link and movable in a predetermined path as the shafts rotate.

3. A generator of the class described including a support, spaced rotatable shafts carried by said support, the distance between said shafts being adjustable, a link having an eccentric connection with one of said shafts, an eccentric sliding connection between the other shaft and the link, each of said eccentric connections being radially adjustable with respect to its rotatable shaft, means for synchronously rotating said shafts in opposite directions, and a tool carried by said link and movable in a predetermined path as the shafts rotate.

4. A generator of the class described including a support, spaced rotatable shafts carried by said support, the distance between said shafts being adjustable, a link having an eccentric connection with one of said shafts, and eccentric sliding connection between the other shaft and the link, one of said eccentric connections being radially adjustable with respect to its rotatable shaft, means for synchronously rotating said shafts in opposite directions, a tool carried by said link and movable in a predetermined path as the shafts rotate, and means for varying the location of said tool on said link.

5. A generator of the class described including a support, spaced rotatable shafts carried by said support, the distance between said shafts being adjustable, a link having an eccentric connection with one of said shafts, an eccentric sliding connection between the other shaft and the link, each of said eccentric connections being radially adjustable with respect to its rotatable shaft, means for synchronously rotating said shafts in opposite directions, a tool carried by said link and movable in a predetermined path as the shafts rotate, and means for varying the location of said tool on said link.

6. A generator of the class described including a support, spaced rotatable shafts carried by said support, the distance between said shafts being adjustable, a link having an eccentric connection with one of said shafts, an eccentric sliding connection between the other shaft and the link, each of said eccentric connections being radially adjustable with respect to its rotatable shaft, means for adjusting the angular relationship between said connections, means for synchronously rotating said shafts in opposite directions, a tool carried by said link and movable in a predetermined path as the shafts rotate, and means for varying the location of said tool on said link.

7. A generator of the class described including a support, spaced rotatable shafts carried by said support, the distance between said shafts being adjustable, an arm mounted on each of said shafts, a link connected to said arms, means for varying the angular relationship between said arms, means for synchronously rotating said arms in opposite directions, and a tool carried by said link and movable in a predetermined path as the arms rotate.

8. A generator of the class described including a support, spaced rotatable shafts carried by said support, the distance between said shafts being adjustable, an arm mounted on each of said shafts, a link fixedly connected to one of said arms and slidingly connected to the other arm, means for varying the angular relationship between said arms, means for synchronously rotating said arms in opposite directions, and a tool carried by said link and movable in a predetermined path as the arms rotate.

9. A generator of the class described including a support, spaced rotatable shafts carried by said support, the distance between said shafts being adjustable, an arm mounted on each of said shafts, a link fixedly connected to one of said arms and slidingly connected to the other arm, means for adjusting the position of said link on said arms, means for varying the angular relationship between said arms, means for synchronously rotating said arms in opposite directions, and a tool carried by said link and movable in a predetermined path as the arms rotate.

10. A machine for manufacturing a blade having an airfoil cross-section, said machine comprises two generators mounted in substantially parallel relationship, each generator including; spaced rotatable shafts, the distance between said shafts being adjustable, a link having an eccentric connection with said shafts, said link being fixedly connected to one of said shafts and slidingly connected to the other shaft, each of said connections being radially adjustable with respect to its rotatable shaft, means for varying the angular relationship between said connections, means for synchronously rotating said shafts in opposite directions, and a single tool supported by the link of each of said generators, said tool being movable in a predetermined path as said generators describe the envelope determined by the adjustments made on each generator.

11. A generator of the class described including a support, spaced rotatable shafts carried by said support, a link having an eccentric connection with each of said shafts, said link being slidably attached at one connection, means for synchronously rotating said shafts in opposite directions, and a tool carried by said link and movable in a predetermined path as the shafts rotate.

OTUS E. ZUIDERHOEK.

REFERENCES CITED

The following references are of record in the file of this patent:

UNITED STATES PATENTS

| Number | Name | Date |
| --- | --- | --- |
| 644,445 | Herz | Feb. 27, 1900 |
| 871,111 | Dander | Nov. 19, 1907 |
| 1,780,211 | Tornebohm | Nov. 4, 1930 |

FOREIGN PATENTS

| Number | Country | Date |
| --- | --- | --- |
| 245,852 | Great Britain | Jan. 18, 1926 |
| 386,506 | Great Britain | Jan. 19, 1933 |